United States Patent [19]

Nakayama

[11] Patent Number: 4,956,799

[45] Date of Patent: Sep. 11, 1990

[54] TRIGONOMETRIC FUNCTION ARITHMETIC PROCESSOR USING PSEUDO-DIVISION

[75] Inventor: Takashi Nakayama, Tokyo, Japan

[73] Assignee: NEC Corporation, Tokyo, Japan

[21] Appl. No.: 428,035

[22] Filed: Oct. 27, 1989

Related U.S. Application Data

[63] Continuation of Ser. No. 213,869, Jun. 30, 1988, abandoned.

[30] Foreign Application Priority Data

Jun. 30, 1987 [JP] Japan .................................. 62-164460
Sep. 18, 1987 [JP] Japan .................................. 62-234195

[51] Int. Cl.$^5$ ............................................. G06F 1/02
[52] U.S. Cl. .................................................... 364/729
[58] Field of Search ........................ 364/729, 721, 817

[56] References Cited

U.S. PATENT DOCUMENTS

4,077,063  2/1978  Lind ..................................... 364/729

FOREIGN PATENT DOCUMENTS

54-104249  8/1979  Japan .................................. 364/729
1331410  9/1973  United Kingdom ................ 364/729

*Primary Examiner*—Gary V. Harkcom
*Assistant Examiner*—Long T. Nguyen

*Attorney, Agent, or Firm*—Foley & Lardner, Schwartz, Jeffery, Schwaab, Mack, Blumenthal & Evans

[57] ABSTRACT

A trigonometric function arithmetic processor comprises a first arithmetic unit for executing, in m steps, a pseudo-division operation for obtaining from an initial value $\theta$ a sequence of numbers $\{a_k\}$ and a pseudoremainder $\epsilon$ which fulfill the following equation $$\theta \overset{m-1}{\underset{k=0}{\pi}} \{a_k \times \arctan(2^{-k})\} + \epsilon$$

where $a_k = +1$ or $-1$, and the trigonometric function arithmetic processor also comprises a second arithmetic unit for executing the following pseudo-multiplication operation in m steps from initial values $X_m = P$ and $Y_m = \epsilon \times P$ (where P=constant) and the sequence of numbers $\{a_k\}$, for $k = m-1, m-2, \ldots 1$ and 0, $$X_{k-1} = X_k - a_k \times 2^{-2k} \times Y_k$$

$$Y_{k-1} = (Y_k + a_k \times X_k)/2^k$$

so that $X_o = Q \times \cos\theta$ nd $Y_o = Q \times \sin\theta$ (Q=constant) are simultaneously obtained.

4 Claims, 4 Drawing Sheets

TRIGONOMETRIC FUNCTION ARITHMETIC PROCESSOR USING PSEUDO-DIVISION

This application is a continuation of application Ser. No. 213,869, filed June 30, 1988, now abandoned.

BACKGROUND OF THE INVENTION

1. Field of the Invention

The present invention relates to a trigonometric function arithmetic processor, and more specifically to a trigonometric function arithmetic processor for use in computers.

2. Description of Related Art

Trigonometric functions such as $\sin \theta$ and $\cos \theta$ are function having a period of $2\pi$ namely 360 degrees. An ability of calculating the trigonometric functions is one function indispensable to computers processing scientific and technical computations.

Hitherto, as a means for obtaining the value of the trigonometric function, there have been known to use rational function approximations such as Taylor expansion which can be expressed as $$\sin \theta = \theta - \theta^3/3! + \theta^5/5! - \theta^7/7! \ldots \quad (1)$$

series fraction expansion, and Chebyshev expansion. However, these methods need a number of multiplication operations and division operations and therefore, require a long operation time. In addition, the satisfied degree of precision cannot be obtained.

Further, a so-called "CORDIC" (coordinate rotation digital computer) arithmetic is known as a trigonometric function arithmetic operation method suitable to microprogram controlled computers. This method can be executed by using addition, subtraction and right shift, and therefore, can be efficiently executed in computers which do not have a high speed multiplication unit.

Here, an arithmetic principle of the CORDIC will be described below with reference to a case in which the values of $\sin \theta$ and $\cos \theta$ are obtained with the precision of n-digits in a binary notation.

An angle $\theta$ can be expressed as follows, by using a constant "$r_k$" and a sequence of numbers $\{a_k\}$:

$$\theta = a_0 \times r_0 + a_1 \times r_1 + a_2 \times r_2 \ldots a_{n-1} \times r_{n-1} + \epsilon \quad (2)$$

where $$r_k = \arctan(2^{-k}) \quad (3)$$

$$a_k = \{+1, -1\} \quad (4)$$

The sequence of numbers $\{a_k\}$ can be spontaneously determined in accordance with a method similar to the division of a non-restoring method. Therefore, the process for determining the sequence of numbers $\{a_k\}$ will be called a "pseudo-division" hereinafter.

Here, according to the theorem of addition, in the case of $a_k = +1$ $$\Psi_{k+1} = \Psi_k + r_k$$

$$\cos(\Psi_{k+1}) = R_k(\cos \Psi_k - 2^{-k} \times \sin \Psi_k) \quad (5)$$

$$\sin(\Psi_{k+1}) = R_k(\sin \Psi_k - 2^{-k} \times \cos \Psi_k) \quad (6)$$

in the case of $a_k = -1$ $$\Psi_{k+1} = \Psi_k - r_k$$

$$\cos(\Psi_{k+1}) = R_k(\cos \Psi_k + 2^{-k} \times \sin \Psi_k) \quad (7)$$

$$\sin(\Psi_{k+1}) = R_k(\sin \Psi_k + 2^{-k} \times \cos \Psi_k) \quad (8)$$

where $$R_k = 1/\sqrt{(1 + 2^{-2k})} \quad (9)$$

Thus, the values of $\sin \theta$ and $\cos \theta$ are obtained by repeatedly executing the above operation so that $\Psi_k$ gradually approach $\theta$. This process will be called a "pseudo-multiplication".

The final $\sin(\Psi_k)$ and $\cos(\Psi_k)$ is multiplied by K, and therefore, it is necessary to correct them.

$$K = \prod_{k=0}^{n-1} (1/R_k) = \prod_{k=0}^{n-1} \sqrt{(1 + 2^{-2k})} \quad (10)$$

Now, explanation will be made on the algorithm of the CORDIC.

(1) It is initialized to $x_0 = 1/K$, $y_0 = 0$, $v_0 = \theta$ ($0 \leq \theta < \pi/2$). Here, K is a constant which fulfils the equation (10).

(2) The following step (3) is repeated for $k = 0, 1, 2, \ldots, (n-1)$.

(3) If $v_k \geq 0$, it is assumed that $a_k = +1$, and if $v_k < 0$, it is assumed that $a_k = -1$, $$x_{k+1} = x_k - a_k \times 2^{-k} \times y_k \quad (11)$$

$$y_{k+1} = y_k + a_k \times 2^{-k} \times x_k \quad (12)$$

$$v_{k+1} = v_k - a_k \times r_k \quad (13)$$

where $r_k$ is a constant fulfilling the equation (3).

(4) $\cos \theta = x_n$ and $\sin \theta = y_n$ can be simultaneously obtained.

Figure 1:
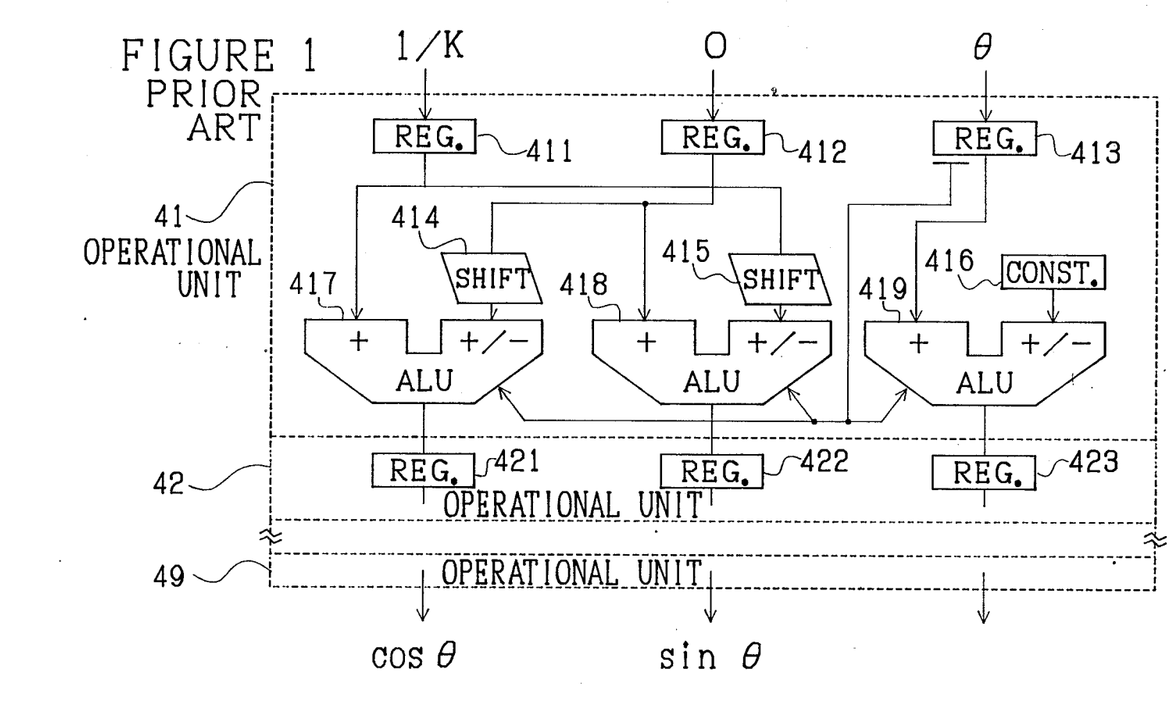
FIG. 1 a block diagram of one typical example of the conventional trigonometric function arithmetic processor.

Referring to FIG. 1, there is shown one example of a pipeline arithmetic processor embodying the algorithm of the CORDIC. The shown processor comprises a cascaded operational units 41, 42, ..., 49 which have the same construction, and constructs n stages of pipeline.

The operational unit 41 has n-bit registers 411, 412 and 413 which respectively store three kinds of variables $x_k$, $y_k$, and $v_k$ in a binary notation. A pair of shifters 414 and 415 are connected to outputs of the registers 412 and 411, respectively. These shifters function to rightwardly shift the received data of n-bits by k bits. In addition, there is provided a constant generator 416 for generating a n-bit constant $r_k$ defined in the above mentioned equation (3). The outputs of the three registers 411, 412 and 413 and the outputs of the shifters 414 and 415 and the constant generator 416 are applied to three n-bit adder/subtracters 417, 418 and 419, as shown.

In the shown processor, the operational units 41, 42, ..., 49 execute the operation the above mentioned algorithm step (3) for $k = 0, 1, \ldots, (n-1)$.

Thus, in a first step [A], 1/K, 0 and $\theta$ are set as initial values to the registers 411, 412 and 413.

In a second step [B], the variable is made to $k = 0$ in the operational unit 41. Therefore, the variable $x_k$ of the equation (11) is stored in the register 411, the variable $y_k$ of the equation (12) is stored in the register 412, and the variable $v_k$ of the equation (13) is stored in the register 413.

The shifters 414 and 415 operate to rightwardly shift the output data from the registers 412 and 411 by k bits. Namely, the output data from the registers 412 and 411 are respectively multiplied by $2^{-k}$. At this time, if the sign bit of the register 413 is positive, $a_k = +1$, and therefore, the adder/subtracters 417 and 419 are controlled to execute the subtraction, and the adder/subtracter 418 is controlled to execute the addition. On the other hand, if the sign bit of the register 413 is negative, since $a_k = -1$, the adder/subtracters 417 and 419 are controlled to execute the addition, and the adder/subtracter 418 is controlled to execute the subtraction.

Thus, the outputs of the three adder/subtracters 417, 418 and 419 are outputted as the variables $x_{k+1}$, $y_{k+1}$, and $v_{k+1}$ to three registers 421, 422 and 423 of the next stage operational unit 42 which respectively correspond to the registers 411, 412 and 413 of the first stage operational unit 41.

Thereafter, in a third step [C], the above mentioned operation (B) are sequentially executed for k=1, 2, ..., (n−1) in the operational units 42, ..., 49.

In a fourth step [D], the final stage operational unit 49 respectively outputs $x_n = \cos \theta$ and $y_n = \sin \theta$ from adder/subtracters (not shown) corresponding to the adder/subtracters 417 and 418 of the first stage operational unit 41.

If an angle $\theta$ is inputted to the register 413 for each clock, the values of $\cos \theta$ and $\sin \theta$ are outputted from the final stage operational unit 49 for every clock. But, assuming that the operation of each of the operational units 41 to 49 needs one clock and the stage number of the operational units 41 to 49 is "n", n clocks are required from the input of the angle $\theta$ to the output of the values of $\cos \theta$ and $\sin \theta$.

The above mentioned trigonometric function arithmetic processor is disadvantageous in the followings:

First, the conventional trigonometric function arithmetic processor requires a large amount of hardware. For example, the above mentioned trigonometric function arithmetic processor needs 2n shifters which can shift data of n-bits by k bits and 3n adder/subtracters. If these circuit elements are assembled on an large scale integrated circuit, since the shifter having a large shift bit number requires a large area, the trigonometric function arithmetic processor will be inevitably of a large size.

Particularly, in order to realize the operation at a high degree of precision, an area for barrel shifters and adder/subtracters is significantly increased. For example, in order to obtain the precision of 32 bits in binary notation, there are required 96 adder/subtracters of 32 bits and a pair of 32-bit shifters which can rightwardly shift by 0, 1, 2, ..., 31 bits, respectively (64 in total).

Secondly, the conventional trigonometric function arithmetic processor can obtain a sufficient degree of precision in the result of the operation. The larger the value "k" is, the value "$r_k$" in the equation (6) will become small, and therefore, the digit number of the significant figures will be decreased. As a result, an rounding error is accumulated at the LSB of the data.

SUMMARY OF THE INVENTION

Accordingly, it is an object of the present invention to provide an trigonometric function arithmetic processor which has overcome the above mentioned defect of the conventional one.

Another object of the present invention is to provide a trigonometric function arithmetic processor which can be constructed of a relatively small number of circuit elements and which can have a high precision in the result of the operation.

Still another object of the present invention is to provide a trigonometric function arithmetic processor which can be constructed of unitary operational units composed of one barrel shifter and two adder/subtracters and which can output an operation result of a high precision at a speed comparable with that of the conventional trigonometric function arithmetic processor.

The above and other objects of the present invention are achieved in accordance with the present invention by a trigonometric function arithmetic processor for use in computers for computing the value of at least trigonometric function $\sin \theta$ and $\cos \theta$, comprising:

a first arithmetic unit for executing, in m steps, a pseudo-division operation for obtaining from an initial value $\theta$ a sequence of numbers $\{a_k\}$ and a pseudo-remainder $\epsilon$ which fulfil the following equation $$\theta \pi \sum_{k=0}^{m-1} \{a_k \times \arctan(2^{-k})\} + \xi$$

where $a_k = +1$ or $-1$, and a second arithmetic unit for executing the following pseudo-multiplication operation in m steps from initial values $Xm = P$ and $Ym = \epsilon \times P$ (where P=constant) and the sequence of numbers $\{a_k\}$, for k=m−1, m−2, ... 1 and 0, $$X_{k-1} = X_k - a_k \times 2^{-2k} \times Y_k$$

$$Y_{k-1} = (Y_k + a_k \times X_k)/2^k$$

so that $X_0 = Q \times \cos \theta$ and $Y_0 = Q \times \sin \theta$ (Q=constant) are simultaneously obtained.

In a preferred embodiment, the first arithmetic unit includes a first memory, a first constant generator for generating a constant $2^k \times \arctan(2^{-k})$ or $\arctan(2^{-k})$ (where k=0, 1, ..., m−1, and a first adder/subtracter means for selectively executing addition or subtraction between the content of the first memory and the just above mentioned constant. On the other hand, the second arithmetic unit includes second and third memories, a shifter for rightwardly shifting the content of the third memory by 2k digits (where k=m−1, m−2, ... 1 and 0), a second adder/subtracter means for selectively executing addition or subtraction between the content of the second memory and the output of the shifter, and a third adder/subtracter means for selectively executing addition or subtraction between the content of the second memory and the content of the third memory.

The above mentioned trigonometric function arithmetic processor operates in the following principle: The basic algorithm of the present trigonometric function arithmetic processor is similar to CORDIC, but not completely identical. Therefore, the algorithm of the present trigonometric function arithmetic processor can be called a modification of CORDIC. In the CORDIC process, the pseudo-division and the pseudo-multiplication are simultaneously executed. However, in the present invention, the pseudo-division is first executed, and then, the pseudo-multiplication is executed.

In the CORDIC process, the pseudo-multiplication has been executed by ignoring the value $\epsilon$ in the equation (2) and by initializing to $x_0 = 1/K$, $y_0 = 0$. Therefore, n steps of operations have been needed for obtaining the degree of precision of n bits in binary notation. However, since $\epsilon < 2^n$ in the equation (2), if the degree of precision of 2n bits in a binary notation is required, approximations $\sin \epsilon \simeq \epsilon$ and $\cos \epsilon \simeq 1$ can be obtained from the equation (1). This is utilized in the present invention. In addition, the pseudo-division process is stopped at m steps ($m = n/2$) and then the pseudo-multiplication process is executed with the initial values of $x_0 = 1/k$, $y_0 = vm/k$. As a result, the total number of the steps including the pseudo-division process and the pseudo-multiplication process is made equal to that of the CORDIC process.

In order to utilize the remainder Vm of the pseudo-division as the initial value of the pseudo-multiplication with a high degree of precision, the pseudo-division is executed by shifting the data to a lower place by one digit for each increment of steps, in the sequence opposite to that of the CORDIC. Therefore, the equations (11) and (12) of the CORDIC algorithm is modified to:

$$x_{k-1} = x_k + a_k \times 2^{-k} \times y_k \quad (15)$$

$$y_{k-1} = y_k - a_k \times 2^{-k} \times x_k \quad (16)$$

Further, with substitution of:

$$X_k = x_k \text{ and } Y_k = 2^{-k} \times y_k, \quad (17)$$

these equations are simplified to:

$$X_{k-1} = X_k - a_k \times 2^{-2k} \times Y_k \quad (18)$$

$$Y_{k-1} = (Y_k + a_k \times X_k)/2 \quad (19)$$

When the value of k is large, the value of $y_k$ is small, and therefore, the substitution of (17) is very effective in preventing the accumulation of rounding errors. In addition, since the equation (19) does not require the shift of a large digit number so that the required number of large digit number shifts.

The trigonometric function arithmetic processor in accordance with the present invention and based on the above mentioned principle operates as follows in the case that the result of operation has the degree of precision of n digits (n = 2m) in the binary notation.

(1) An angle $\theta$ ($0 \leq \theta < \pi/2$) is inputted.

(2) The following step (3) is repeated for $k = 0, 1, 2, \ldots, (m-1)$.

(3) If $v_k \geq 0$, it is assumed that $a_k = +1$, and if $v_k < 0$, it is assumed that $a_k = -1$, $$V_{k+1} = 2(V_k - a_k \times \Gamma_k) \quad (20)$$

where $\Gamma_k = 2^k \times \arctan(2^{-k}) \quad (21)$ (4) $Xm = (1/K)$ and $Ym = Vm \times (1/K/2) \quad (22)$ are set as the initial values, where $1/K$ is a constant fulfilling the equation (10).

(5) The following step (6) is repeated for $k = m, m-1, \ldots, 2, 1, 0$ (6) $X_{k-1} = X_k - a_k \times 2^{-2k} \times Y_k \quad (18)$ $Y_{k-1} = (Y_k + a_k \times X_k)/2 \quad (19)$ $\cos \theta = xn$ and $\sin \theta = yn$ can be simultaneously obtained.

(7) $\cos \theta = X_0$ and $\sin \theta = 2 \times Y_0$ are simultaneously obtained.

However, if only the ration of $\sin \theta$ to $\cos \theta$ should be obtained, the step (4) may be executing by putting $$Xm = 1 \text{ or } 0 \text{ and } Ym = Vm/2 \quad (23)$$

Therefore, the multiplication is not necessary.

The above and other objects, features and advantages of the present invention will be apparent from the following description of preferred embodiments of the invention with reference to the accompanying drawings.

DESCRIPTION OF THE PREFERRED EMBODIMENTS

Figure 2:
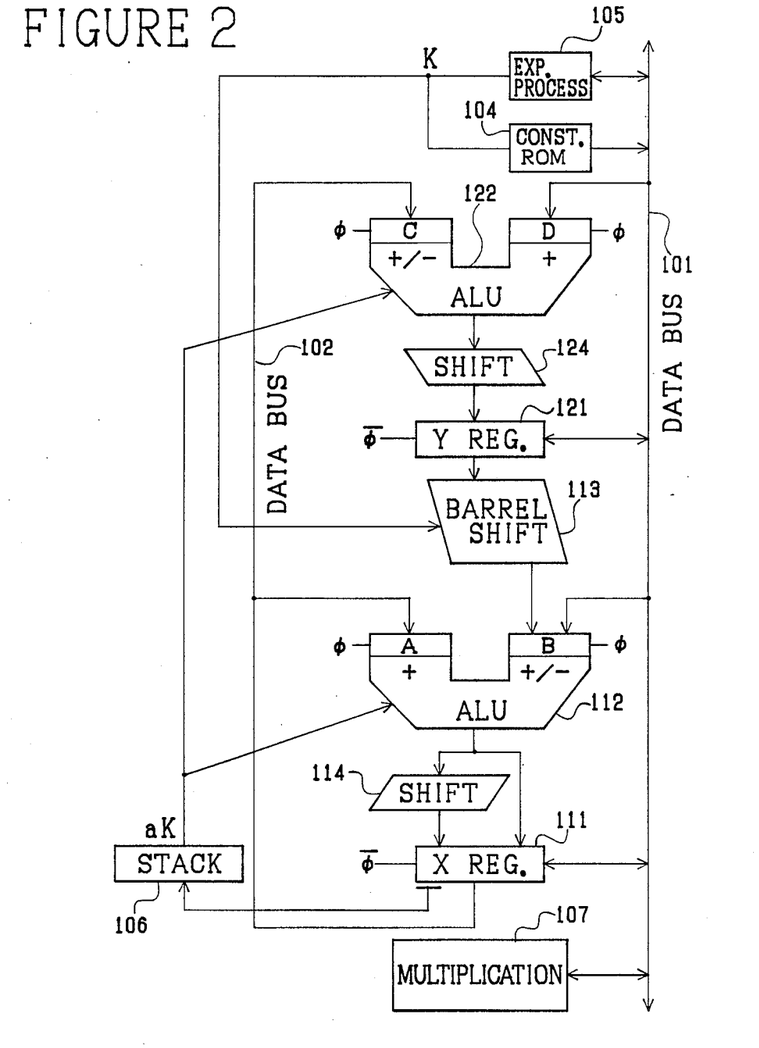
FIG. 2 a block diagram of one embodiment of the trigonometric function arithmetic processor in accordance with the present invention.

Referring to FIG. 2, there is shown a block diagram of a first embodiment of the trigonometric function arithmetic processor in accordance with the present invention for computing the trigonometric functions $\sin \theta$ and $\cos \theta$.

The shown processor comprises a pair of data buses 101 and 102 and a pair of registers 111 and 121 coupled to the data bus 101 for storing two kinds of variables X and Y, respectively. Further, the processor includes a pair of adder/subtracters 112 and 122 having a pair of inputs A and B and C and D respectively coupled to the data buses 101 and 102 for executing the addition/subtraction of the equations (18), (19) and (20). One input B of the adder/subtracter 112 coupled to the data bus 102 is also coupled to receive an output of a barrel shifter 113 which rightwardly shifts the content of the register 121 by any selected even number bits. An output of the adder/subtracter 112 is connected to the register 111 directly and through a shifter 114 for doubling the output of the adder/subtracter 112. An output of the register 111 is coupled to the data bus 102 so that the content of the register is inputted to the one inputs A and C of the adder/subtracters 112 and 122. An output of the adder/subtracter 122 is coupled to another shifter 124 which halves the output of the adder/subtracter 122 and outputs the halved data to the register 121.

To the data bus 101 is connected a ROM 104 storing the constant $\Gamma_k$ and the constant $1/K$ fulfilling the equation (10). This ROM 104 has a capacity of $(2m+1)$ words. In addition, an exponent part processing unit 105 is coupled to the data bus 101. This exponent part processing unit 105 controls the amount of shift of the barrel shifter 113 and the an address of the ROM 104, and also, calculates the arithmetic operation of the exponent part. A stack 106 is coupled to a sign part of the register 111 so as to store the sequence of numbers $\{a_k\}$ in the first-in first-out manner. A multiplication circuit 107 is coupled to the bus 101 so as to receive a multiplier and a multiplicand from the bus 101 and outputs the result of the multiplication to the bus 101.

Now, operation of the above mentioned trigonometric function arithmetic processor will be described with reference to the arithmetic algorithm of the present invention.

(1) The value of $\theta = 2^{-i} \times \Theta$ ($1 \leq \Theta < 2$, i=integer) expressed in a binary floating point representation is inputted from the bus 101 and the complement of the exponent part is inputted to the exponent part arithmetic processing unit 105.

(2) The mantissa part $\Theta$ of $\theta$ is inputted to the register 111.

(3) The following operation (4) is repeated while incrementing the output value of the exponent part arithmetic processing unit 105 in the order of i, i+1, i+2, ..., m−1.

(4) The value $V_k$ of the register 111 is transferred through the bus 102 to the input A of the adder/subtracter 112, and at the same time the constant $\Gamma_k$ is transferred from the ROM 104 through the bus 101 to the input B of the adder/subtracter 112. Further, the value of the sign bit of the register 111 is simultaneously inputted or pushed to the stack 106. If the sign bit of the register 111 indicates the positive, the adder/subtracter 112 will subtract the input B from the input A. On the other hand, if the sign bit of the register 111 indicates the negative, the adder/subtracter 112 will add the input B to the input A. The result of the arithmetic operation is outputted to the shifter 114 and the data doubled by the shifter 114 is written into the register 111.

(5) The value of Vm is read out from the register 111 through the bus 101 and is transferred to the register 121 and the multiplication circuit 107. In addition, the constant 1/K is supplied from the ROM 104 to the multiplication circuit 107, so that the result Vm/K of the multiplication is outputted through the bus 101 to the register 111.

(6) The following operation (7) is repeated while decrementing the output value of the exponent part arithmetic processing unit 105 in the order of m, m−1, m−2, ..., i+1.

(7) The value $X_k$ of the register 111 is transferred through the bus 102 to the input A of the adder/subtracter 112 and the input C of the adder/subtracter 112 and the input C of the adder/subtracter 122, and at the same time, the value $Y_k$ is transferred from the register 121 through the bus 101 to the input D of the adder/subtracter 122. Furthermore, the content $Y_k$ of the register 121 is rightwardly shifted in the barrel shifter 113 by the digit number corresponding to the doubled value of the content of the exponent part arithmetic processing unit 105 (multiplication of $2^{-2k}$), and the output of the barrel shifter thus obtained is inputted to the input B of the adder/subtracter 112. If the sign bit popped out from stack 106 indicates the positive, the adder/subtracter 112 will subtract the input B from the input A. On the other hand, if it is negative, the adder/subtracter 112 will add the input B to the input A. The result of the arithmetic operation is written into the register 111. At the same time, if the sign bit popped out from stack 106 indicates the positive, the adder/subtracter 122 will add the input D to the input C. On the other hand, if the popped out sign bit is negative, the adder/subtracter 122 will subtract the input C from the input D. The result of the arithmetic operation is outputted to the shifter 124 and the data halved by the shifter 124 is written into the register 121.

(8) Thus, the cos $\theta$ is obtained in the register 111 and the mantissa of sin $\theta$ is obtained in the register 121. The exponent part of sin $\theta$ is the same of the value $\theta$.

Now, assuming that the operation of the steps (4) and (7) executed with only one clock and the multiplication of the step (5) is executed with $\alpha$ clocks, a total processing time needs about $(2m+\alpha)=(n+\alpha)$. Namely, the operation is delayed than that of the CORDIC by the processing time of the multiplication circuit/.

As seen from the above, the above mentioned processor can compute cos $\theta$ and sin $\theta$ at a high speed and at high precision by using one barrel shifter and two adder/subtracters.

The above mentioned processor have processed the floating point data, but can a fixed point data in the following steps:

(1) $Vi = \theta$ ($0 \leq \theta < \pi/4$) is inputted as an initial data.

(2) The variable "i" is set to i=0.

(3) to (7) The same operation as that in the above mentioned case of the floating point representation.

(8) cos $\theta = Xi$ and sin $\theta = Yi$ are simultaneously obtained.

Figure 3:
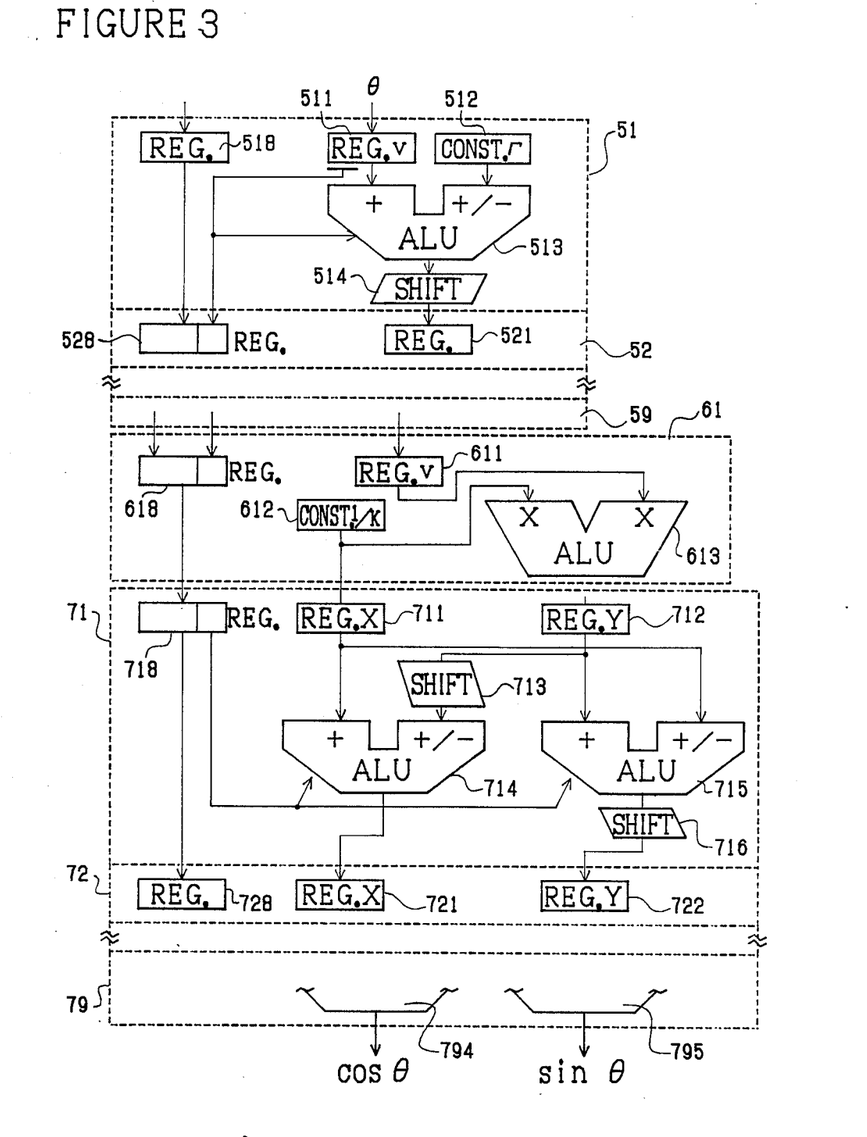
FIG. 3 a block diagram of another embodiment of the trigonometric function arithmetic processor in accordance with the present invention.

Turning to FIG. 3, there is shown a block diagram of another embodiment of the trigonometric function arithmetic processor in accordance with the present invention.

The shown processor includes arithmetic operational units 51, 52, ..., 59 which form a m-stage pseudo-division pipeline processor, an arithmetic operational unit 61 for computing an initial value for a pseudo-multiplication and arithmetic operational units 71, 72, ..., 79 which form a m-stage pseudo-multiplication pipeline processor.

The arithmetic operational units 51, 52, ..., 59 have the same structure of hardware but are different in the variable "k" held therein. Namely, the arithmetic operational units 51, 52, ..., 59 retain, as the variable "k", 0, 1, ..., m−1, respectively. The arithmetic operational unit 51 comprises a n-bit register 511 for storing the variable $V_k$ and a constant generator 512 for generating the constant $\Gamma_k$ of n bits. The register 511 and the constant generator 512 is coupled to a pair of inputs of an adder/subtracter 513 of n bits, whose output is connected to a n-bit shifter 514 for leftwardly shifting the received data by one bit. An output of the shifter 514 is connected to a register 521 of the next arithmetic operational unit 52. Further, a k-bit register 518 is provided to receive a sequence of numbers $\{a_0, a_1, \ldots, a_{k-2}, a_{k-1}\}$, and connected to a register 528 of the next arithmetic operational unit 52. In addition, an sign part of the register 511 is connected as a control input to the adder/subtracter 513 and also is connected to the register 528 of the next arithmetic operational unit 52.

The arithmetic operational unit 61 comprises a n-bit register 611 for storing the variable Vm from the arithmetic operational unit 59 and a constant generator 512 for generating the constant 1/K of n bits which fulfils the equation (10). The register 611 and the constant generator 612 is coupled to a pair of inputs of a multiplication circuit 613 of n bits, which multiplies the content of the register 611 by the constant of the generator 612 and outputs a halved data of the result of the multiplication. Further, there is provided a (m+1)-bit register 618 for storing a sequence of numbers $\{a_0, a_1, \ldots, a_m\}$.

The arithmetic operational units 71, 72, ..., 79 have the same structure of hardware but are different in the variable "k" held therein. Namely, the arithmetic operational units 71, 72, ..., 79 retain, as the variable "k", $m-1, m-2, \ldots, 0$, respectively. The arithmetic operational unit 71 comprises a pair of n-bit registers 711 and 712 for storing the variables $X_k$ and $Y_k$. The register 712 is coupled to a n-bit shifter 713 for rightwardly shift the received data by 2k bits. An output of the shifter 713 and an output of the register 711 are coupled to a pair of inputs of an n-bit adder/subtracter 714, respectively. Further, the outputs of the registers 711 and 712 are coupled to a pair of inputs of an n-bit adder/subtracter 715, respectively. An output of the adder/subtracter 715 is coupled to a n-bit shifter 716 for rightwardly the received data by one bit. In addition, a (k+1)-bit register 718 is provided to receive a sequence of numbers $\{a_0, a_1, \ldots, a_{k-2}, a_{k-1}\}$.

The processor shown in FIG. 3 will operate as follows on the basis of the arithmetic algorithm of the present invention:

(1) The value of $\theta$ $(\theta < \pi/2)$ expressed in a binary fixed point representation is inputted.

(2) In the arithmetic operational unit 51, the variable k is set as k=0. If the sign of value $V_k$ held in the register 511 is positive, the adder/subtracter 513 is controlled to subtract the constant $\Gamma_k$ of the generator 512 from the content of the register 511. If the sign of value $V_k$ is negative, the adder/subtracter 513 is controlled to add the constant $\Gamma_k$ of the generator 512 to the content of the register 511. The shifter 514 operates to double the output of the adder/subtracter 513 and outputs the doubled data to the register 521 of the next arithmetic operational unit 62. On the other hand, the register 518 stores the sequence of numbers $\{a_0, a_1, \ldots, a_{k-2}, a_{k-1}\}$, and receives the sign bit of the register 511 as the value "$a_k$". Therefore, the register 518 outputs the sequence of numbers $\{a_0, a_1, \ldots, a_{k-2}, a_{k-1}, a_k\}$ to the register 528 of the next stage.

(3) The same operation as the step (2) is sequentially executed in the arithmetic operational units, 52, ..., 59 in the named order by putting the variable "k" as k=1, 2, ..., m−1. An output of the arithmetic operational unit 59 is outputted to the arithmetic operational unit 61.

(4) In the arithmetic operational unit 61, the value Vm held in the register 611 is multiplied by the constant 1/K outputted from the generator 612 so that the value Ym of the equation (22) is generated. The respective outputs of the register 618, the constant generator 612 and the multiplication circuit 613 are supplied to the registers 718, 711 and 712.

(5) In the arithmetic operational unit 71, the variable "k" is set to k=m−1.

The value $Y_k$ of the register 712 is rightwardly shifted by k bits in the shifter 713, namely multiplied by $2^{-2k}$. Then, the value "$a_k$" is extracted from the sequence of numbers $\{a_0, a_1, \ldots, a_{k-2}, a_{k-1}, a_k\}$ held in the register 718. If "$a_k$" is positive, the adder/subtracter 714 is controlled to subtract the output of the shifter 713 from the content of the register 711, and the adder/subtracter 715 is controlled to add the output of the register 711 to the output of the register 712. If "$a_k$" is negative, the adder/subtracter 714 is controlled to add the output of the shifter 713 to the content of the register 711, and the adder/subtracter 715 is controlled to subtract the output of the register 711 from the output of the register 712. The shifter 716 operates to halve the output of the adder/subtracter 715. Thus, the sequence of numbers $\{a_0, a_1, \ldots, a_{k-2}, a_{k-1}\}$ held in the register 718 and the outputs of the adder/subtracter 714 and the shifter 716 are supplied to the registers of the next stage arithmetic operational unit 72.

(6) The same operation as the step (5) is sequentially executed in the arithmetic operational units, 72, ..., 79 in the named order by putting the variable "k" as k=m−2, m−3, ..., 0.

(7) Thus, an adder/subtracter 794 of the last stage arithmetic operational unit 79 outputs cos $\theta$, and at the same time, an adder/subtracter 795 of the last stage arithmetic operational unit 79 outputs sin $\theta$.

Assuming that the angle $\theta$ is inputted for every clock, cos $\theta$ and sin $\theta$ are outputted from the adder/subtracters 794 and 795 of the last stage arithmetic operational unit 79, respectively, for every clock. Therefore, assuming that each of the arithmetic operational units 51, 52, ..., 59, 61, 71, 72, ..., 79 executes its operation for one clock, the time from the moment the angle $\theta$ is inputted to the moment cos $\theta$ and sin $\theta$ are outputted will need a time corresponding (n+1) clocks.

Figure 4:
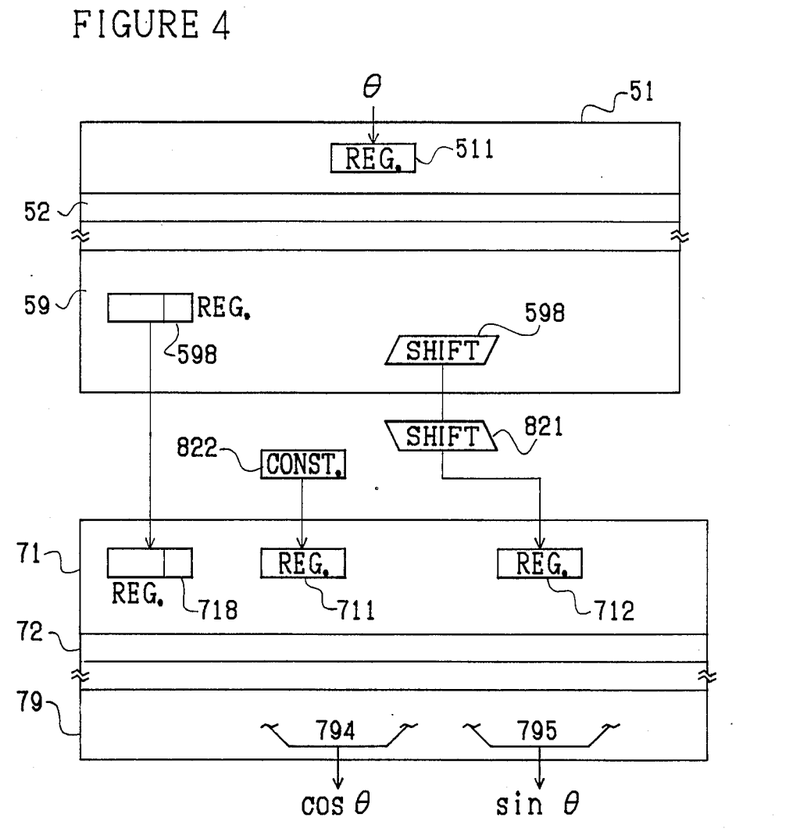
FIG. 4 a block diagram of still another embodiment of the trigonometric function arithmetic processor in accordance with the present invention.

Referring to FIG. 4, there is shown a block diagram of still another embodiment of the trigonometric function arithmetic processor in accordance with the present invention. This processor is based on the equation (23), not the equation (22), and therefore, there are outputted K×sin $\theta$ and K×cos $\theta$, where K is a constant fulfilling the equation (10). In addition, this processor can be said to a modification of the processor shown in FIG. 3, and therefore, elements similar to those shown in FIG. 3 are given the same Reference Numerals, and a detailed explanation thereof will be omitted.

Similarly to the processor shown in FIG. 3, the processor shown in FIG. 4 includes the arithmetic operational units 51, 52, ..., 59 for the m-stage pseudo-division, and the arithmetic operational units 71, 72, ..., 79 for the m-stage pseudo-multiplication. But, in place of the arithmetic operational unit 61 for computing an initial value for a pseudo-multiplication, there are provided a shifter 821 for rightwardly shifting the output of the shifter 594 by one bit and outputting the one-bit shifted data to the register 712 and a constant generator 822 for outputting a constant "1" or "0" to the register 311.

If the angle $\theta$ is inputted to the register 711 for every clock, K×sin $\theta$ and K×cos $\theta$ are outputted from the adder/subtracters 794 and 795 of the last stage arithmetic operational unit 79, respectively, for every clock. Therefore, assuming that each of the arithmetic operational units 51, 52, ..., 61, 71, 72, ..., 79 executes its operation for one clock, the time from the moment the angle $\theta$ is inputted to the moment K×sin $\theta$ and K×cos $\theta$ are outputted will need a time corresponding "n" clocks.

Particularly, the embodiment shown in FIG. 4 can be assembled of a smaller amount of hardware than that required in the embodiment shown in FIG. 3 by an amount corresponding to the multiplication circuit.

The preferred embodiments of the trigonometric function arithmetic processor in accordance with the present invention thus described have the following advantages:

First, the trigonometric function arithmetic processor in accordance with the present invention can be constructed of a reduced amount of hardware. Particularly, the embodiment shown in FIG. 2 is composed of one barrel shifter and two adder/subtracters, which is reduced in the amount of hardware by one barrel shifter and one adder/subtracter as compared with the conventional one. The elements newly added as compared with the conventional one are the stack and the multiplication circuit. The stack can be formed of a m-bit shift register, and the multiplication circuit can be realized by adding a simple circuit to one of the adder/subtracters provided in the embodiment of FIG. 2. The amount of hardware increased by these elements is smaller than the decreased amount of hardware.

In addition, in the case that the trigonometric function arithmetic processor is composed as a general purpose floating point arithmetic operation units, the two barrel shifters and the three adder/subtracters used in the conventional one have no use other than to computation of trigonometric functions and reverse trigonometric functions.

Turning to the embodiment shown in FIG. 3, the trigonometric function arithmetic processor is composed of (n/2) n-bit shifter having the shift amount of 2k bits, (3n/2) n-bit adder/subtracters and one n-bit multiplication circuit capable of multiplying n-bit data by n-bit data. The n-bit multiplication circuit can be formed by (n/2) adder/subtracters of n bits in accordance with Booth's algorithm. Therefore, this embodiment can be composed of 2n adder/subtracters.

For example, in order to the degree of precision of 32 digits in the binary notation, this embodiment can be composed of 64 adder/subtracters of 32 bits and 16 shifters of 32 bits which can give a rightward shift of 30 bits, 28 bits, . . . , 0 bit, respectively. Namely, the required amount of shift is doubled, but the number of the required shifters is reduced to ¼. Further, the number of adder/subtracters is reduced to ⅔.

In addition, the trigonometric function arithmetic processor in accordance with the present invention can give the result of arithmetic operation with a high degree of precision. The algorithm of the present invention will execute the operation while adjusting the digits of the data so as to have a maximum significant figures. Therefore, a high degree of precision can be obtained. Moreover, in the case of $\theta$, $\sin \theta$ and $\cos \theta$ in the floating point representation, even if the value of $\theta$ is very small, the significant figures are not decreased, and since the rounding errors are not accumulated, the result of the operation will have a high degree of precision.

The invention has thus been shown and described with reference to the specific embodiments. However, it should be noted that the present invention is in no way limited to the details of the illustrated structures but changes and modifications may be made within the scope of the appended claims.

I claim:

1. A trigonometric function arithmetic processor for use in computers for computing the values of trigonometric function $\sin \theta$ and $\cos \theta$, with a resolution of n bits (where n=2m and m is positive integer), comprising:

a bus to which an input angular data of $\theta$ is supplied in the form of a binary floating-point number;
an exponent processing means coupled to said bus for receiving an exponent i (where i=integer) of said angular data and for incrementing its output k in the order of i, i+1, i+2, . . . , m−1 and then decrementing its output k in the order of m, m−1, m−2, . . . , i+1;
constant memory means coupled to said bus for storing a constant 1/K where $$K = \prod_{k=0}^{n-1} \sqrt{(1 + 2^{-2k})}$$

and a sequence of constants $\Gamma_k = 2^k \times \arctan(2^{-k})$ where k=i, i+1, i+2, . . . , m−1;
first register means coupled to said bus for receiving a mantissa $V_k$ of said angular data;
stack means coupled to said first register means for receiving a sign data of said mantissa of said angular data stored in said first register means;
first adder/subtracter means having a first input connected to said first register means and a second input coupled to said bus for receiving a constant $\Gamma_k$ from said constant memory means, said first adder/subtracter means being controlled by an output of said stack means so that when said sign data indicates positive said first adder/subtracter means executes subtraction of said second input from said first input, and when said sign data indicates negative said first adder/subtracter means executes addition between said first and second inputs, this addition/subtraction of said first adder/subtracter means being repeatedly performed each time said output k of said exponent processing means is incremented in the order of i, i+1, i+2, . . . , m−1;
first shifter means coupled to an output of said first adder/subtracter means for writing a doubled value of said output of said first adder/subtracter means to said first register means each time said output k of said exponent processing means is incremented, so that each time said output k of said exponent processing means is incremented, said first register means is written with $V_{k+1} = 2(V_k - a_k \times \Gamma_k)$ where $a_k$ is a sign data given by said stack means, a content Vm of said first register means obtained when said output k of said exponent processing means has been incremented to m−1 being used as an initial value $X_k$;
multiplication means coupled to said bus for receiving said constant 1/K from said constant memory means and said content Vm of said first register means obtained when said output k of said exponent processing means has been incremented to m−1, for generating a product Vm/K;
second register means coupled to said bus for receiving, as an initial value $Y_k$, said product Vm/K generated by said multiplication means;
second adder/subtracter means having a first input connected to said first register means and a second input coupled to said bus for receiving said initial value $Y_k$ from said second register means, said second adder/subtracter means being controlled by said output of said stack means so that when said sign data indicates positive said second adder/subtracter means executes addition between said first and second inputs and when said sign data indicates negative said second adder/subtracter means executes subtraction of said first input from said second input;
second shifter means coupled to an output of said second adder/subtracter means for writing a halved value of said output of said second adder/subtracter means to said second register means each time said output k of said exponent processing means is decremented; and barrel shift means coupled to said second shift register means for outputting $2^{-2k}$ times the value of the content of said second shift register means to said second input of said first adder/subtracter means;

so that when said output k of said exponent processing means is decremented in the order of m, m−1, m−2, ..., i+1, said first and second adder/subtracter means being controlled by said output of said stack means so as to respectively add/subtract each time said output k of said exponent processing means is decremented, whereby, each time said output k of said exponent processing means is decremented, said first register means holds $X_{k-1}=X_k-a_k\times 2^{-2k}\times Y_k$ and said second register means holds $Y_{k-1}=(Y_k+a_k\times X_k)/2$, and finally, said first register means holds a value corresponding to cos $\theta$ and said second register means holds a value corresponding to a mantissa of sin $\theta$.

2. A trigonometric function arithmetic processor for use in computers for computing the values of trigonometric function sin $\theta$ and cos $\theta$, with a resolution of n bits (where n=2m and m is positive integer), comprising:

a bus to which an input angular data of $\theta$ is supplied in the form of a binary fixed-point number;

an processing means for incrementing its output k in the order of 0, 1, 2, ..., m−1 and then decrement its output k in the order of m, m−1, m−2, ..., 1;

constant memory means coupled to bus for storing a constant 1/K where $$K = \prod_{k=0}^{n-1} \sqrt{(1+2^{-2k})}$$

and a sequence of constants $\Gamma_k=2^k\times arctan\ (2^{-k})$ where k=0, 1, 2, ..., m−1;

first register means coupled to said bus for receiving said angular data as $V_k$;

stack means coupled to said first register means for receiving a sign data of said angular data stored in said first register means;

first adder/subtracter means having a first input connected to said first register means and a second input coupled to said bus for receiving a constant $\Gamma_k$ from said constant memory means, said first adder/subtracter means being controlled by an output of said stack means so that when said sign data indicates positive said first adder/subtracter means executes subtraction of said second input from said first input, and when said sign data indicates negative said first adder/subtracter means executes addition between said first and second inputs, the addition/subtraction of said first adder/subtracter means being repeatedly performed each time said output k of said exponent processing means is incremented in the order of 0, 1, 2, ..., m−1;

first shifter means coupled to an output of said first adder/subtracter means for writing a doubled value of said output of said first adder/subtracter means to said first register means each time said output k of said processing means is incremented, so that each time said output k of said processing means is incremented, said first register means is written with $V_{k+1}=2(V_k-a_k\times\Gamma_k)$ where $a_k$ is a sign data given by said stack means, a content Vm of said first register means obtained when said output k of said processing means has been incremented to m−1 being used as an initial value $X_k$;

multiplication means coupled to said bus for receiving said constant 1/K from said constant memory means and said content Vm of said first register means obtained when said output k of said processing means has been incremented to m−1, for generating a product Vm/K;

second register means coupled to said bus for receiving, as an initial value $Y_k$, said product Vm/K generated by said multiplication means;

second adder/subtracter means having a first input connected to said first register means and a second input coupled to said bus for receiving said initial value $Y_k$ from said second register means, said second adder/subtracter means being controlled by said output of said stack means so that when said sign data indicates positive said second adder/subtracter means executes addition between said first and second inputs, and when said sign data indicates negative said second adder/subtracter means executes subtraction of said first input from said second input;

second shifter means coupled to an output of said second adder/subtracter means for writing a halved value of said output of said second adder/subtracter means to said second register means each time said output k of said processing means is decremented; and barrel shift means coupled to said second shift register means for outputting $2^{-2k}$ times value of the content of said second shift register means to said second input of said first adder/subtracter means;

so that when said output k of said processing means is decremented in the order of m, m−1, m−2, ..., i+1, said first and second adder/subtracter means being controlled by said output of said stack means so as to respectively add/subtract each time said output k of said processing means is decremented, whereby, each time said output k of said processing means is decremented, said first register means holds $X_{k-1}=X_k-a_k\times 2^{-2k}\times Y_k$ and said second register means holds $Y_{k-1}=(Y_k+a_k\times X_k)/2$, and finally, said first register means holds a value corresponding to cos $\theta$ and said second register means holds a value corresponding to sin $\theta$.

3. A trigonometric function arithmetic processor for computing the values of trigonometric function sin $\theta$ and cos $\theta$, with a resolution of n bits (where n=2m and m is positive integer) and in a pipelined manner, comprising:

m stages of cascaded pseudo-division processing units having the same construction and assigned to variables k where k=0, 1, 2, ..., m−1, each unit including:

first register means coupled to receive a variable $V_k$, the first register means of a first stage being connected to receive a mantissa of said angular data as variable $V_k$, and the first register means of the other stages being connected to receive a variable $V_k$ output of a preceding stage as the variable $V_k$;

a constant generator outputting a constant $\Gamma_k=2^k\times arctan\ (2^{-k})$;

second register means coupled to receive a sign data of said mantissa of said angular data stored in said first register means for outputting the sign data to the second register means of a succeeding stage;

first adder/subtracter means having a first input connected to said first register means and a second input coupled to receive a constant $\Gamma_k$ from said constant generator, said first adder/subtracter means being controlled by said sign data stored in said first register means so that when said sign data indicates positive said first adder/subtracter means executes subtraction of said second input from said first input, and when said sign data indicates negative said first adder/subtracter means executes addition between said first and second inputs;

first shifter means coupled to an output of said first adder/subtracter means for writing a doubled value of said output of said first adder/subtracter means as the variable $V_{k+1}$ to said first register means of the succeeding stage;

an arithmetic operation unit having a first register coupled to receive the variable Vm from the last stage of pseudo-division processing unit as an initial value $X_k$, a constant generator outputting a constant 1/K where $$K = \prod_{k=0}^{n-1} \sqrt{(1 + 2^{-2k})},$$

multiplication means coupled to receive said constant 1/K from said constant generator and said content Vm of said first register means for outputting a product Vm/K as an initial value $Y_k$, and second register means receiving the content of the second register means of the last stage of pseudo-division processing unit; and m stages of cascaded pseudo-multiplication processing units having the same construction and assigned to variables k where k=0, 1, 2, ..., m−1, each unit including:

first register means coupled to receive a variable $X_k$, the first register means of a first stage being connected to receive the variable $X_k$ of said an arithmetic operation unit, and the first register means of the other stages being connected to receive a variable $X_k$ output of a preceding stage;

second register means coupled to receive a variable $Y_k$, the first register means of a first stage being connected to receive the variable $Y_k$ of said an arithmetic operation unit, and the first register means of the other stages being connected to receive a variable $Y_k$ output of a preceding stage;

third register means holding a sign data, the third register means of a first stage being coupled to said second register means of said pseudo-multiplication processing unit, and the third register means of the other stage being coupled to said third register means of a preceding stage;

barrel shift means coupled to said second shift register means for outputting $2^{-2k}$ times value of the content of said second shift register means;

first adder/subtracter means having a first input connected to said first register means and a second input coupled to said barrel shifter means, said first adder/subtracter means being controlled by said sign data of said third register means so that when said sign data indicates positive said first adder/subtracter means executes subtraction of said second input from said first input, and when said sign data indicates negative said first adder/subtracter means executes addition between said first and second inputs so that said first adder/subtracter means outputs $X_{k-1}=X_k-a_k\times 2^{-2k}\times Y_k$;

second adder/subtracter means having a first input connected to said first register means and a second input coupled to said second register means, said second adder/subtracter means being controlled by said sign data stored in said third register means so that when said sign data indicates positive said second adder/subtracter means executes addition between said first and second inputs, and when said sign data indicates negative said second adder/subtracter means executes subtraction of said first input from said second input; and second shifter means coupled to an output of said second adder/subtracter means for writing a halved value, $Y_{k-1}=(Y_k+a_k\times X_k)/2$, of said output of said second adder/subtracter means to said second register means of a succeeding stage;

whereby said first adder/subtracter means of the last stage of pseudo-multiplication processing unit outputs a value corresponding to cos $\theta$ and said second adder/subtracter means of the last stage of pseudo-multiplication processing unit outputs a value corresponding to sin $\theta$.

4. A trigonometric function arithmetic processor claimed in claim 3, wherein said multiplication means is composed of a shifter coupled to receive said content Vm of said first register means for outputting a shifter value as said product Vm/K.

* * * * *